(12) United States Patent
Pinault

(10) Patent No.: US 10,402,791 B2
(45) Date of Patent: Sep. 3, 2019

(54) SYSTEM AND METHOD FOR ELECTRONIC MONEY WITHDRAWAL

(71) Applicant: THE ROBERTO GIORI COMPANY LTD, Pully (CH)

(72) Inventor: Francis Pinault, Juvignac (FR)

(73) Assignee: THE ROBERTO GIORI COMPANY LTD., Pully (CH)

( * ) Notice: Subject to any disclaimer, the term of this patent is extended or adjusted under 35 U.S.C. 154(b) by 1466 days.

(21) Appl. No.: 14/260,491

(22) Filed: Apr. 24, 2014

(65) Prior Publication Data
US 2014/0324689 A1    Oct. 30, 2014

(30) Foreign Application Priority Data
Apr. 24, 2013 (EP) .................................. 13165166

(51) Int. Cl.
| | | |
|---|---|---|
| *G06Q 20/10* | (2012.01) | |
| *G06Q 20/06* | (2012.01) | |
| *G07F 19/00* | (2006.01) | |
| *G06Q 20/32* | (2012.01) | |
| *G06Q 20/36* | (2012.01) | |

(52) U.S. Cl.
CPC ....... *G06Q 20/065* (2013.01); *G06Q 20/1085* (2013.01); *G06Q 20/3223* (2013.01); *G06Q 20/367* (2013.01); *G07F 19/203* (2013.01)

(58) Field of Classification Search
CPC ...... G07F 19/20; G07F 19/201; G07F 19/203; G07F 19/211; G06Q 20/10; G06Q 20/3223; G06Q 20/1085
See application file for complete search history.

(56) References Cited

U.S. PATENT DOCUMENTS

| | | | |
|---|---|---|---|
| 2005/0021886 A1 | 1/2005 | Adema et al. | |
| 2006/0074772 A1 | 4/2006 | Kamasaki et al. | |
| 2011/0313924 A1 | 12/2011 | Carell et al. | |
| 2012/0160912 A1* | 6/2012 | Laracey ............ | G06Q 20/1085 235/379 |
| 2013/0166448 A1* | 6/2013 | Narayanan ............ | H04W 60/04 705/44 |
| 2014/0297526 A1* | 10/2014 | Martin ............... | G06Q 20/1085 705/42 |

FOREIGN PATENT DOCUMENTS

| | | |
|---|---|---|
| JP | 2001 283296 A | 10/2001 |
| JP | 2009 087052 A | 4/2009 |
| WO | 2012/120011 A1 | 9/2012 |

OTHER PUBLICATIONS

European Search Report, dated Dec. 3, 2013, from corresponding EP application.

* cited by examiner

*Primary Examiner* — Christopher Stanford
(74) *Attorney, Agent, or Firm* — Young & Thompson

(57) ABSTRACT

The present invention concerns a system and method for electronic money withdrawal. This operation is implemented by a transfer of electronic money from the user electronic wallet to a money distribution authority, typically a bank. Advantageously, a strong authentication occurs previously with the bank. The transfer includes the ATM identifier. A delivery identifier is delivered to the user. The user is then goes to the ATM and proceeds to the withdrawal with its GSMT id and delivery id. Accordingly a robust and reliable withdrawal is possible. It may be actually done at the ATM without the mobile device handling the electronic wallet.

18 Claims, 9 Drawing Sheets

SYSTEM AND METHOD FOR ELECTRONIC MONEY WITHDRAWAL

FIELD OF THE INVENTION

Background of the Invention

The present invention concerns a system and method for electronic money withdrawal. More particularly, it relates to determining a reliable process for transforming electronic money into actual paper banknotes similarly to a cash withdrawal at an automated teller machine (ATM) from a bank account.

Description of the Prior Art

The electronic money is used within a global system as, for instance, the global system described in the patent application published under reference WO 2012/120011 A1 by the applicant. This system is named after inventor Roberto Giori the Global Standard for Money Technology (GSMT). In such a system, the electronic money is represented by a unique identification named IEDB standing for Identification of an Electronic/Digital Banknote. This IEDB is included in a digital data named RIEDB standing for reference of IEDB.

This electronic money is carried out by its owner in a digital wallet typically implemented as an application in a portable electronic device such as a mobile phone. The system is supervised and controlled by a centralized entity. This entity maintains a database of all the currency managed by the system. It also maintains a database of references of all the users of the system. The users may be registered users owning a reference in the system. In some embodiments the users may be known only by their mobile phone number registered in the course of a transaction.

For some specific usage or to deal with people not owning an electronic wallet, it may be desirable to be able to exchange electronic money against real paper banknotes.

SUMMARY OF THE INVENTION

The present invention has been devised to address one or more of the foregoing concerns. Its purpose is to propose a solution to implement a withdrawal process for electronic money. This operation is implemented by a transfer of electronic money from the user electronic wallet to a money distribution authority, typically a bank. Advantageously, a strong authentication occurs previously with the bank. The transfer includes the ATM identifier. A delivery identifier is delivered to the user. The user is then goes to the ATM and proceeds to the withdrawal with its GSMT id and delivery id. Accordingly a robust and reliable withdrawal is possible. It may be actually done at the ATM without the mobile device handling the electronic wallet.

The invention concerns a method for exchanging electronic banknotes against real banknotes by a withdrawal at an ATM, comprising by a mobile device handling an electronic wallet obtaining an identifier of the ATM targeted for the withdrawal; sending a request to a central server including the ATM identifier for the exchange of at least one electronic banknote contained in said electronic wallet and the user identifier; receiving a withdrawal authorization from the central server and waiting to an acknowledgement of the withdrawal from the central server to validate the withdrawal transaction.

According to an embodiment, said ATM identifier is obtained from a user entry on the mobile device.

According to an embodiment, said ATM identifier is obtained from a selection by the user among a list of proposed ATM by a geo location application.

According to an embodiment, said ATM identifier is obtained from the targeted ATM by a connection established between the ATM and the mobile device.

According to an embodiment, the method further comprises displaying a withdrawal authorization identifier received in the withdrawal authorization.

According to an embodiment, the method further comprises marking the at least one banknote to be exchanged as reserved until the validation of the withdrawal transaction.

According to an embodiment, the method further comprises communicating through the central server with a user interface module on a computing device connected to the central server.

The invention also concerns a method for exchanging electronic banknotes against real banknotes by a withdrawal at an ATM, comprising by central server receiving a request including the ATM identifier for the exchange of at least one electronic banknote contained in an electronic wallet from a device mobile handling said electronic wallet and the user identifier; checking the request; determining the authority in charge of said ATM from its identifier; forwarding the request to the identified authority; receiving from the authority a withdrawal authorization including a withdrawal authorization identifier; forwarding said withdrawal authorization to the mobile device and validating the transaction when an acknowledgment is received from the authority.

According to an embodiment, determining the authority in charge of said ATM from its identifier comprises interrogating a database that gives for each ATM identifier the authority it is associated with.

According to an embodiment, determining the authority in charge of said ATM from its identifier comprises decoding an authority identifier encoded in the ATM identifier.

The invention also concerns a method for exchanging electronic banknotes against real banknotes by a withdrawal at an ATM, comprising by an authority server in charge of the ATM: receiving a request including the ATM identifier for the exchange of at least one electronic banknote and the user identifier from a central server; checking the request; generating a withdrawal authorization identifier; sending to the central server a withdrawal authorization including the generated withdrawal authorization identifier; sending a withdrawal authorization to the ATM including an identifier of the user and the generated withdrawal authorization identifier; receiving an acknowledgement from the ATM and forwarding the acknowledgement to the central server.

According to an embodiment, the method further comprises triggering a timeout when sending a withdrawal authorization to the ATM; and cancelling the operation if the acknowledgment has not been received before the timeout runs out.

The invention also concerns a method for exchanging electronic banknotes against real banknotes by a withdrawal at an ATM, comprising by the ATM receiving a withdrawal authorization from an authority in charge of the ATM including an identifier of the user and the generated withdrawal authorization identifier; obtaining an user identifier and a withdrawal authorization identifier from a user; checking the obtained user identifier and withdrawal authorization identifier against the received user identifier and withdrawal authorization identifier; if the obtained user identifier and withdrawal authorization identifier and the received user identifier and withdrawal authorization identifier match, deliver banknotes; and sending an acknowledge to the authority in charge of the ATM.

According to an embodiment, the method further comprises triggering a timeout when receiving a withdrawal authorization to the ATM; and cancelling the operation if the banknotes have not been delivered before the timeout runs out.

According to an embodiment, the method further comprises if real banknotes matching the electronic banknotes are not available in the ATM, delivering other real banknotes for a same amount.

The invention also concerns a mobile device for exchanging electronic banknotes against real banknotes by a withdrawal at an ATM, comprising an electronic wallet to manage the electronic banknotes; means for obtaining an identifier of the ATM targeted for the withdrawal; means for sending a request to a central server including the ATM identifier for the exchange of at least one electronic banknote contained in said electronic wallet and the user identifier; means for receiving a withdrawal authorization from the central server; and means for waiting to an acknowledgement of the withdrawal from the central server to validate the withdrawal transaction.

The invention also concerns a central server for exchanging electronic banknotes against real banknotes by a withdrawal at an ATM, comprising means for receiving a request including the ATM identifier for the exchange of at least one electronic banknote contained in an electronic wallet from a device mobile handling said electronic wallet and the user identifier; means for checking the request; means for determining the authority in charge of said ATM from its identifier; means for forwarding the request to the identified authority; means for receiving from the authority a withdrawal authorization including a withdrawal authorization identifier; means for forwarding said withdrawal authorization to the mobile device; and means for validating the transaction when an acknowledgment is received from the authority.

The invention also concerns an authority server in charge of an ATM for exchanging electronic banknotes against real banknotes by a withdrawal at the ATM, comprising means for receiving a request including the ATM identifier for the exchange of at least one electronic banknote and the user identifier from a central server; means for checking the request; means for generating a withdrawal authorization identifier; means for sending to the central server a withdrawal authorization including the generated withdrawal authorization identifier; means for sending a withdrawal authorization to the ATM including an identifier of the user and the generated withdrawal authorization identifier; means for receiving an acknowledgement from the ATM; and means for forwarding the acknowledgement to the central server.

The invention also concerns an ATM for exchanging electronic banknotes against real banknotes by a withdrawal at the ATM, comprising means for receiving a withdrawal authorization from an authority in charge of the ATM including an identifier of the user and the generated withdrawal authorization identifier; means for obtaining an user identifier and a withdrawal authorization identifier from a user; means for checking the obtained user identifier and withdrawal authorization identifier against the received user identifier and withdrawal authorization identifier; means for delivering banknotes if the obtained user identifier and withdrawal authorization identifier and the received user identifier and withdrawal authorization identifier match; and means for sending an acknowledge to the authority in charge of the ATM.

The invention also concerns a computer program product for a programmable apparatus, the computer program product comprising a sequence of instructions for implementing a method according to the invention, when loaded into and executed by the programmable apparatus.

The invention also concerns a computer-readable storage medium storing instructions of a computer program for implementing a method according to the invention.

The invention also concerns a computer program product for a programmable apparatus, the computer program product comprising a sequence of instructions for implementing a method according to the invention, when loaded into and executed by the programmable apparatus.

The invention also concerns a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 3 illustrates the structure of a record representing an electronic banknote according to an embodiment of the invention;

FIG. 4 illustrates the structure of a record representing a transaction according to an embodiment of the invention;

DETAILED DESCRIPTION OF THE INVENTION

Figure 1:
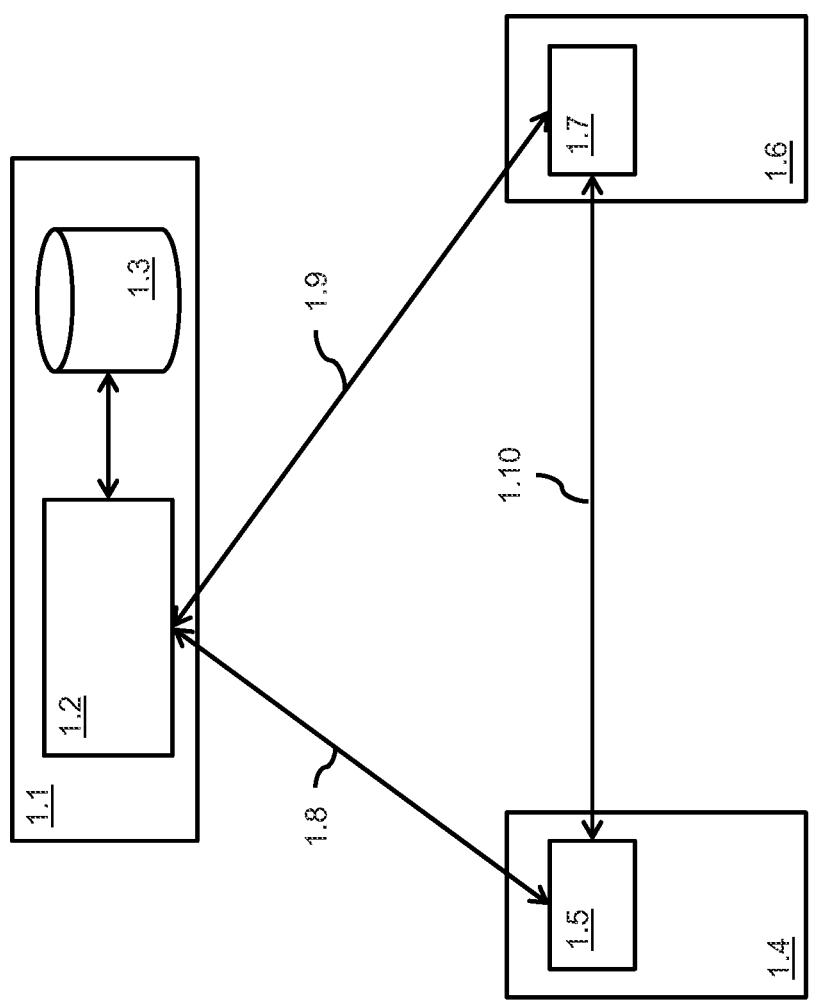
FIG. 1 illustrates the general architecture of the elements in the system involved in an electronic money transfer.

FIG. 1 illustrates the general architecture of the elements in the system involved in an electronic money transfer. The system comprises a central server 1.1, typically a GSMT server. This server may be physically implemented with a plurality of physical servers that may or may not be located in a single place. Logically, it is constituted by a database that stores and handles different data stores. A first store registers all the electronic banknotes managed by the system. A second store registers the users of the system. These users may be registered users with a unique identity in the system. In some embodiment of the invention, some users may only be known by their phone number. Actually, this allows the system to be largely used by people without needing to create an account. The formalities to get a mobile phone subscription will replace a regular registration in the system.

A front end 1.2 is implementing the different functionalities made available to the users. It gathers the registration of a unique identity of users, the management of this unique identity and the management of the transfer of electronic money involved during a transaction between two users.

A first user owns a first mobile device 1.4 holding a virtual wallet 1.5. Similarly, a second user owns a second mobile device 1.6 handling a second virtual wallet 1.7. It should be understood that these mobile device may be of any kind as long as they got a user interface to interact with the user, memory storage to store the data representing the virtual wallet and communication means to communicate, references 1.8 and 1.9, with the front end 1.2. These communication means are typically using the data communication abilities of the device used for the connection to a data network as Internet. Advantageously, but not necessarily they may also include communication means to communicate directly, reference 1.10, with each other. These direct means of communication may use wireless communication as Bluetooth, WiFi, NFC (standing for Near Field Communication) or others. All these technologies allow establishing a direct communication between two devices in the vicinity of each other and exchanging some data. Typically, the mobile device is a mobile phone, preferably of the smartphone category.

A typical electronic money transfer involves the following operations. Assuming the first user is the emitter, a request for the transfer is submitted from the virtual wallet 1.5 to the front end 1.2. This request includes the identity in the system of the emitter. This identity may be constituted by the GSMT unique identifier of the user or by its phone number depending on the embodiment of the invention. The request also includes the identifier of the electronic banknote to be transferred and the identity of the recipient. This identity may be entered in the mobile device 1.4 by the emitter or advantageously it may be communicated by the second mobile device 1.6 using direct communication means 1.10 or obtained by any other means by the mobile device. Advantageously it also includes the face value of the banknote to be transferred, the time of the transaction request and the location of the emitter at that time.

When received by the frontend server 1.2, the request is checked to determine its validity. Typically, the identity of the emitter is checked with its right to carry out such a transfer. The identity of the recipient is also checked. It is also checked to whether the electronic banknote is registered to actually belong to the emitter. The procedure may include other checks not described here. Next, if all these checks succeed, the frontend 1.2 send a request for approval of the transfer to the recipient, namely the second user. This request is sent to the second mobile device using the communication means 1.9. The second user has to approve the transaction. An acknowledgment is then sent from the second mobile device to the frontend 1.2. The frontend validates the transaction and acknowledges it to both users. The electronic money is no longer available in the virtual wallet of the first user while being present in the virtual wallet of the second user. At the server level, the electronic banknote is registered as belonging to the second user.

Figure 2:
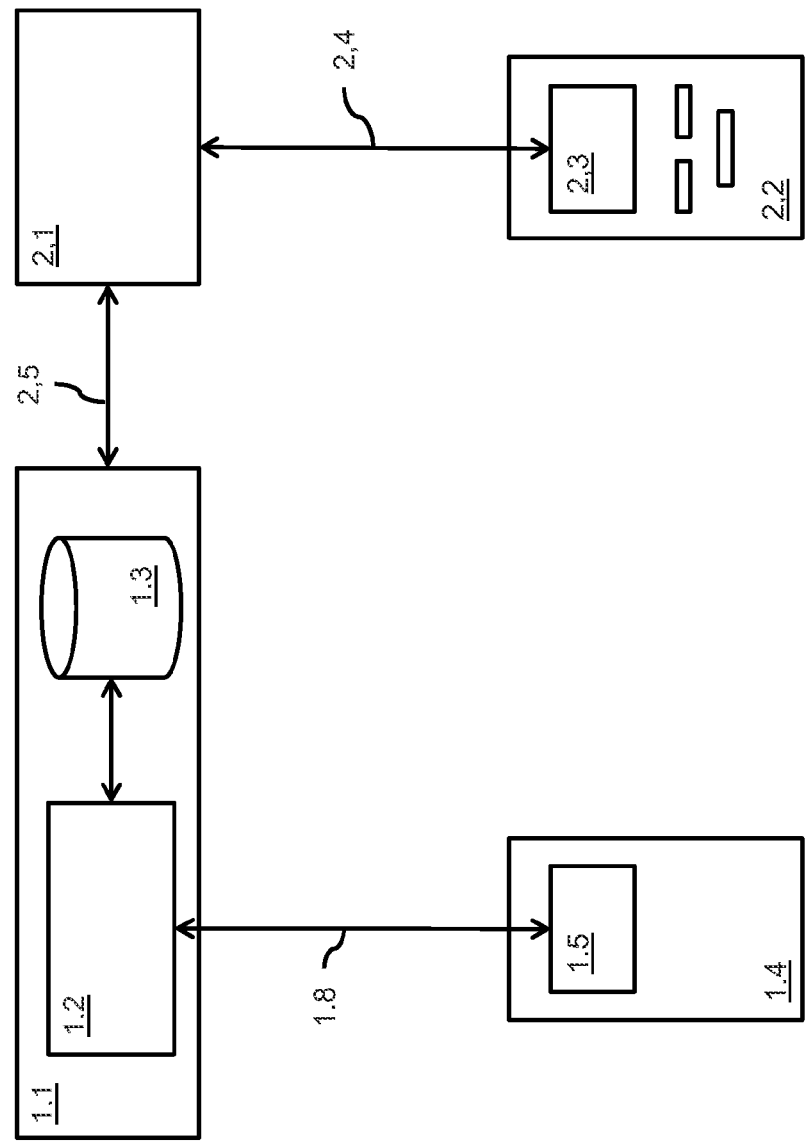
FIG. 2 illustrates the general architecture of the elements in the system involved in an electronic money withdrawal.

In the context of the invention, other components play a role. Essentially an automated teller machine (ATM) which is controlled by an authority mandated for the distribution of banknotes, typically a bank. In the following we will use the word bank to designate this authority, this word being to be interpreted broadly as the designation of any authority in charge of a fleet of ATM machines. This is illustrated on FIG. 2 where the components identical to those of FIG. 1 share the same reference number. In this embodiment, the GSMT central server 1.1 is connected to a central server 2.1 pertaining to the bank by the communication link 2.5. This bank server 1.1 is connected to a plurality of ATMs 2.2, only one being represented, by the communication link 2.4. In some embodiments, the GSMT authority may also be the authority in charge of the ATM. In that case, the GSMT server 1.1 and the bank server 2.1 may actually be the same. In that case, this unique server undertakes the steps of both processes illustrated by FIGS. 7 and 8. The ATM 2.2 advantageously includes means for the reservation of requested real banknote for a given time duration.

Figures 3, 4:
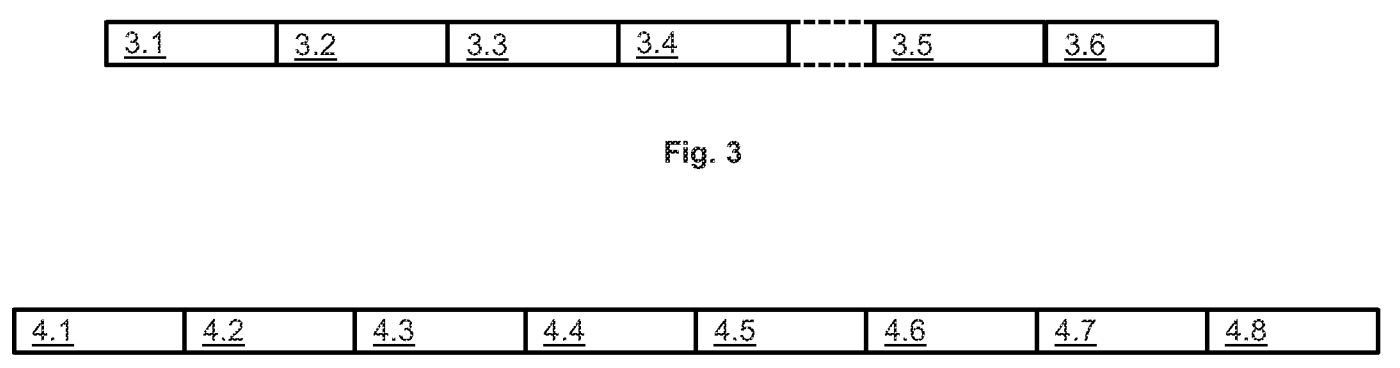

FIG. 3 illustrates the structure of a record representing an electronic banknote according to an embodiment of the invention. The first field 3.1 is the length of the data record in byte. Alternatively, this field may contain the length of the data record and the number of transactions stored within. The second field 3.2 is the IEDB itself, meaning the identifier of the electronic banknote. Advantageously, the third field 3.3 is the face value of the electronic banknote. Next, the data record includes the fields registering the transactions from field 3.4 to field 3.5 which number is variable. The structure of the transaction field will be detailed below in relation with FIG. 4. Advantageously, a last field 3.6 is there to insure the consistency of the record. This may be a checksum as, for instance, a CRC (Cyclic Redundancy Check). Preferably this field consists in a digital signature of the record by the server using asynchronous cryptography signature algorithm. Accordingly the record may be checked for its authenticity and its integrity.

FIG. 4 illustrates the structure of a record representing a transaction according to an embodiment of the invention. According to this embodiment, the first field 4.1 of the record is the identifier of the banknote, namely the IEDB. The second field 4.2 of the record is face value of the banknote. The field 4.3 is the emitter identifier. This identifier may be the GSMT user identifier of the emitter or alternatively his phone number. Next, the field 4.4 of the record is the identifier of the recipient of the transfer. Advantageously, the record may include the date 4.5 of the transaction with the time 4.6. It may also include the location 4.7. The location may be obtained automatically by virtue of geolocation means included in the mobile device. Today, most of the smartphone on the market include some geolocation means based on the Global Positioning System or GPS. These geolocation means may also be based on GSM base station triangulation or databases containing the location of WiFi access points. Advantageously, a last field 4.8 is there to insure the consistency of the record. This may be a checksum as, for instance, a CRC (Cyclic Redundancy Check). Preferably this field consists in a digital signature of the record by the server using asynchronous cryptography signature algorithm. Accordingly the record may be checked for its authenticity and its integrity.

Figure 5:
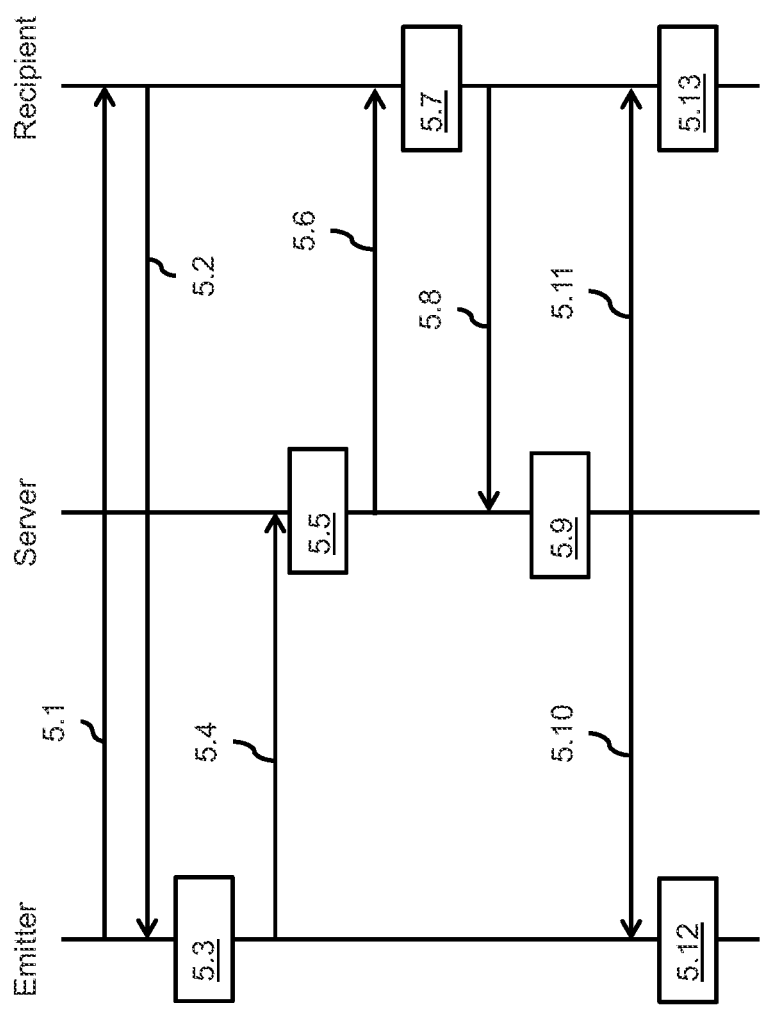
FIG. 5 illustrates the data exchanges occurring in an electronic money transfer according to an embodiment of the invention.

FIG. 5 illustrates the data exchanges occurring in an electronic money transfer according to an embodiment of the invention. The main steps involved in a method to carry out an electronic banknote transfer will now be described. The money transfer involves an emitter who is the owner of the electronic banknote and a recipient who is the recipient of the transfer. The server represents the authority managing the electronic money. Both the emitter and the recipient should have a virtual wallet typically operated by a mobile device such as a smartphone. The electronic banknote subject of the transfer belongs initially to the emitter and is managed in his virtual wallet on his mobile device. The emitter as an owner of electronic money is known from the authority managing this electronic money. He owns a unique identity on the server and is identified by a so called GSMT identifier. In some embodiment, this identifier may be his mobile phone number. Typically, the recipient is also known by the authority and also owns a unique identity on the server. In some embodiments, the recipient may be new to the authority. In the latter case, a unique identity will be created on the server in the process of the transfer. This unique identity will then be typically linked to the mobile phone number of the recipient. This unique identity may be automatically created for example based on the mobile phone subscription of the recipient using his phone number.

In a first step, the emitter needs to know about the recipient identifier, this identifier being a GSMT identifier or the phone number. This identifier may be communicated by the recipient to the emitter and entered in the virtual wallet by the latter. Advantageously, the emitter and the recipient establish a direct connection between their devices. This direct connection may be established based on Bluetooth, WiFi or NFC technologies. It may also be established over Internet using the data capabilities of the smartphones. Once the connection is established, the emitter virtual wallet sends a request 5.1 to the receiver virtual wallet to request the recipient identifier. The recipient's virtual wallet replies to this request with the message 5.2 containing the requested identifier.

During step 5.3, the virtual wallet of the emitter generates a request 5.4 to be sent to the server of the authority for the transfer. Advantageously this request includes the identifier of the emitter, the identifier of the receiver and the data record representing the electronic banknote to be transferred. This data record is typically the data record described in relation to FIG. 3.

During step 5.5, the server is first making some checks on the received request to validate the request. A first check is made on the identity of the emitter. For instance, it is verified if this user is known and is not subject to any restriction. The receiver is also checked for the same. In some embodiments, if the user is not already registered in the system, his unique identity is created at this moment. Next the data record representing the electronic banknote is validated. By virtue of the history of transactions embedded in the data record representing the electronic banknote, it is possible to check the coherency of the transaction chain. Therefore it is possible to check that the current owner is coherent with all the past transaction related to this banknote. This verification may be carried out without needing to access the database. This is a great advantage considering that the system is supposed to handle a great amount of users and transaction and that the response of the server needs to be made as fast as possible to allow a real time. By embedding the history of transactions right into the data record representing the electronic banknote, the desirable verifications may be conducted easily and rapidly saving the need to access in real time the huge central database to consolidate the chain of transactions in order to determine if the emitter is the actual owner of the banknote. Next, the record of the outstanding transaction is generated and integrated in the data record representing the electronic banknote. Its storage stands by waiting to the validation by the recipient.

Next, a request for validation 5.6 is sent to the recipient. Advantageously, this request includes the identifier of the emitter and the data record representing the electronic banknote including the outstanding transaction. During step 5.7, the transaction is presented to the recipient for validation. Once the transaction has been validated by the recipient an acknowledgment 5.8 is sent back to the server. According to a particular embodiment of the invention, the recipient's virtual wallet may be adapted to carry out a validity check on the data record representing the electronic banknote. By virtue of the presence of the embedded history of transactions within the data record, a check of the transaction chain may be made by the wallet of the recipient. This allows the recipient to validate on his own the electronic money which is proposed to him without the need to access the central server.

During step 5.9, the server checks the received data record representing the electronic banknote and checks it for coherency and validity. The outstanding transaction is then validated and stored in the database. Acknowledgments 5.10 and 5.11 are sent to both the emitter and the receiver to validate the transaction. The virtual wallets of the emitter and the recipient are updated accordingly in step 5.12 respectively 5.13. The transferred banknote is removed from the virtual wallet of the emitter and added to the virtual wallet of the recipient.

Figure 6:
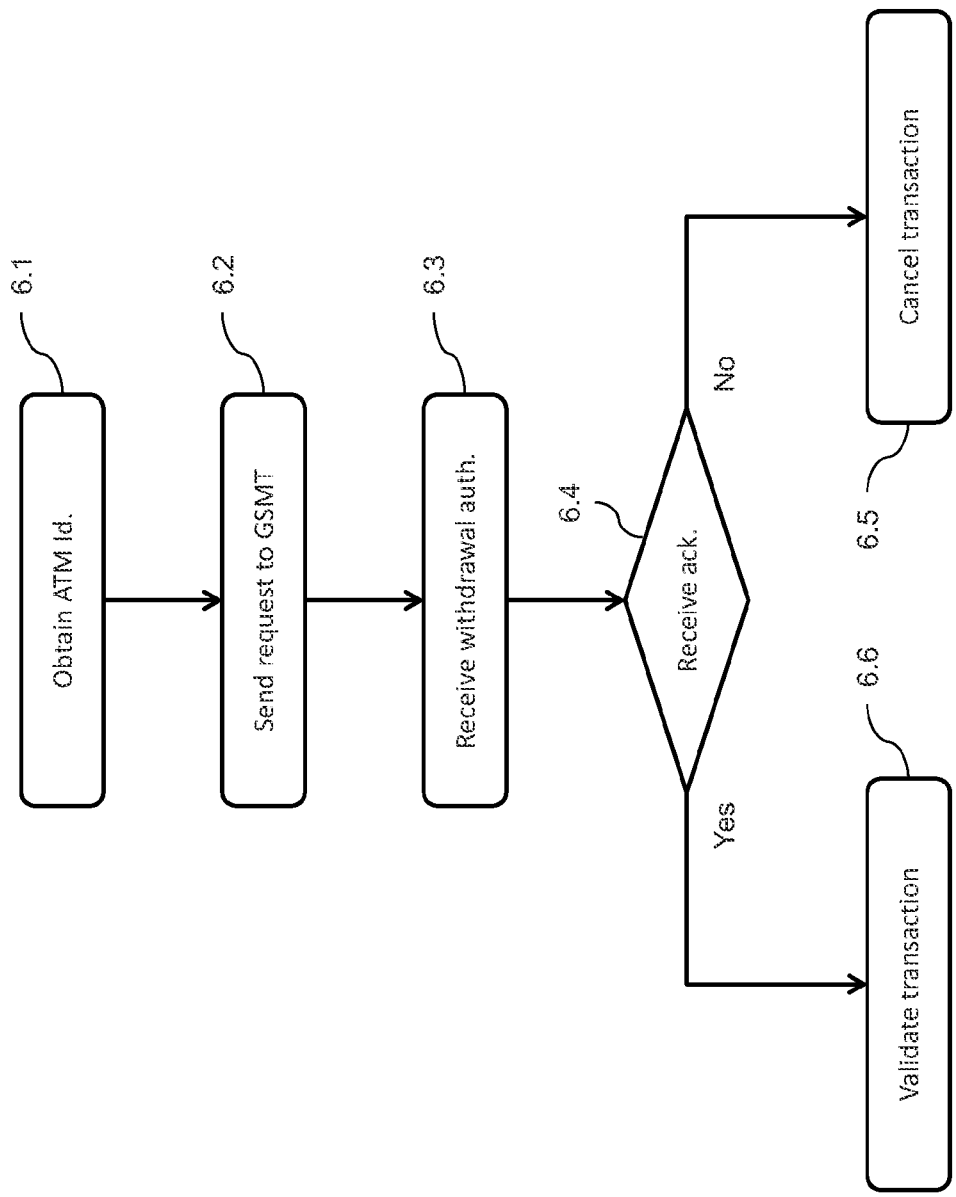
FIG. 6 illustrates the main steps of a process for exchanging electronic banknotes against real banknotes in an ATM by a mobile device handling an electronic wallet according to an embodiment of the invention.

FIG. 6 illustrates the main steps of a process for exchanging electronic banknotes against real banknotes in an ATM by a mobile device handling an electronic wallet. Typically, this process is undertaken by a software module, a withdrawal module, included in the electronic wallet. It may also be implemented as a dedicated application using the electronic wallet or as a feature of an application executed by the mobile device.

In a first step 6.1, an identifier of the ATM machine target of the withdrawal may be obtained by the mobile device. Several alternatives may be contemplated to do so. In a first embodiment, this id is displayed on the machine and read by the user who enters it in the application on the mobile device. In an alternate embodiment, a geo location application is made available on the mobile device. This geo location application may give to the user a map of available ATM machine in the neighbourhood or near a given address. The user selects one of the proposed ATM for its transaction. By doing so, the identifier of the selected ATM is obtained by the withdrawal module. In yet another embodiment, the mobile device may establish a connection to the ATM, for example using wireless communication means as Bluetooth or WiFi, in order to get the identifier from the ATM. Any other method to obtain the identifier may be contemplated.

In a step 6.2, the withdrawal module sends a request to the GSMT server for the withdrawal transaction. This request is similar to the one sent to initiate a typical electronic money transfer. The difference is that instead of the GSMT identifier of the recipient, the request includes the identifier of the ATM targeted for the transaction. The request identifies at least one electronic banknote to be exchanged. Advantageously, these banknotes are marked as reserved until the achievement of the transaction in order to prevent any other use of them in the meantime.

As a response to this request, in a step 6.3, the withdrawal module of the mobile device receives a withdrawal authorization from the GSMT server. If for any reason, the withdrawal is to be refused or is not possible, a refusal message is received. The withdrawal authorization includes an identifier of this authorization that will be needed to actually proceed to the transaction at the ATM. Advantageously; this authorization identifier is communicated to the user. For example, it may be displayed to the user. The user is then supposed to proceed to the actual withdrawal with its GSMT identifier and the authorization identifier. Advantageously, the mobile device is not needed to achieve the transaction. Accordingly, the user is able to prepare the withdrawal in advance and next to proceed to the actual withdrawal without having its mobile device with him. This allows preventing a possible robber to coercively force the user to a further withdrawal from the device.

Next, the mobile device waits for an acknowledgement message of the transaction in step 6.4. If this acknowledgement message is received, it means that the withdrawal has been correctly achieved and the withdrawal may validate the transaction in a step 6.6. The exchanged electronic banknotes disappear from the electronic wallet. If it is not after a predetermined time frame, or if an error message is received, the withdrawal transaction is cancelled in a step 6.5. The reserved electronic banknotes are released.

In some embodiments, in response to some problems occurring during the actual delivery of the real banknotes, for example a jammed ATM, the reserved electronic banknotes may stay reserved until a solution is given to the problem and the withdrawal may eventually occur. For example, the withdrawal may be redirected to another ATM in the neighbourhood.

In some embodiments, an additional authentication step occurs before initiating the withdrawal process. This authentication takes place between the user through its mobile device and the bank server. A strong authentication reinforces the security of the withdrawal transaction. In that case, the user is asked to authenticate on the mobile device. Any authentication may be contemplated. It may be based on passwords or biometric technologies as fingerprint, iris analysis. It may also be asked to the user to take a picture of himself to be compared with a picture stored in a database. The process illustrated by FIG. 6 will take place only if the authentication succeeds.

In an alternate embodiment, the withdrawal module is split into two different modules. The first one is dedicated to the electronic wallet management and is located in the mobile device. The second one is dedicated to the user interface and located on a computing device, computer, tablet pc or others. The computing device is able to communicate with the central server using any communication means, typically an Internet connection. The user is opening a session on the central server from its computing device. For security reason, the central server validate the opening of the session by sending a confirmation message to the mobile device asking the user to confirm on the mobile device that the session is valid. Once confirmed by the user on the mobile device, the session opened by the computing device allows the user to prepare the withdrawal operation from its computing device. Access to the electronic wallet from this second module on the computing device takes place through the central server acting as a proxy between the computing device and the mobile device. This second module on the computing device may be a simple Web interface, the corresponding Web server being typically on the central server. From a system point of view, the processes for preparing the withdrawal operation are still the same. The user interface of the withdrawal module is simply shift to the computing device.

Figure 7:
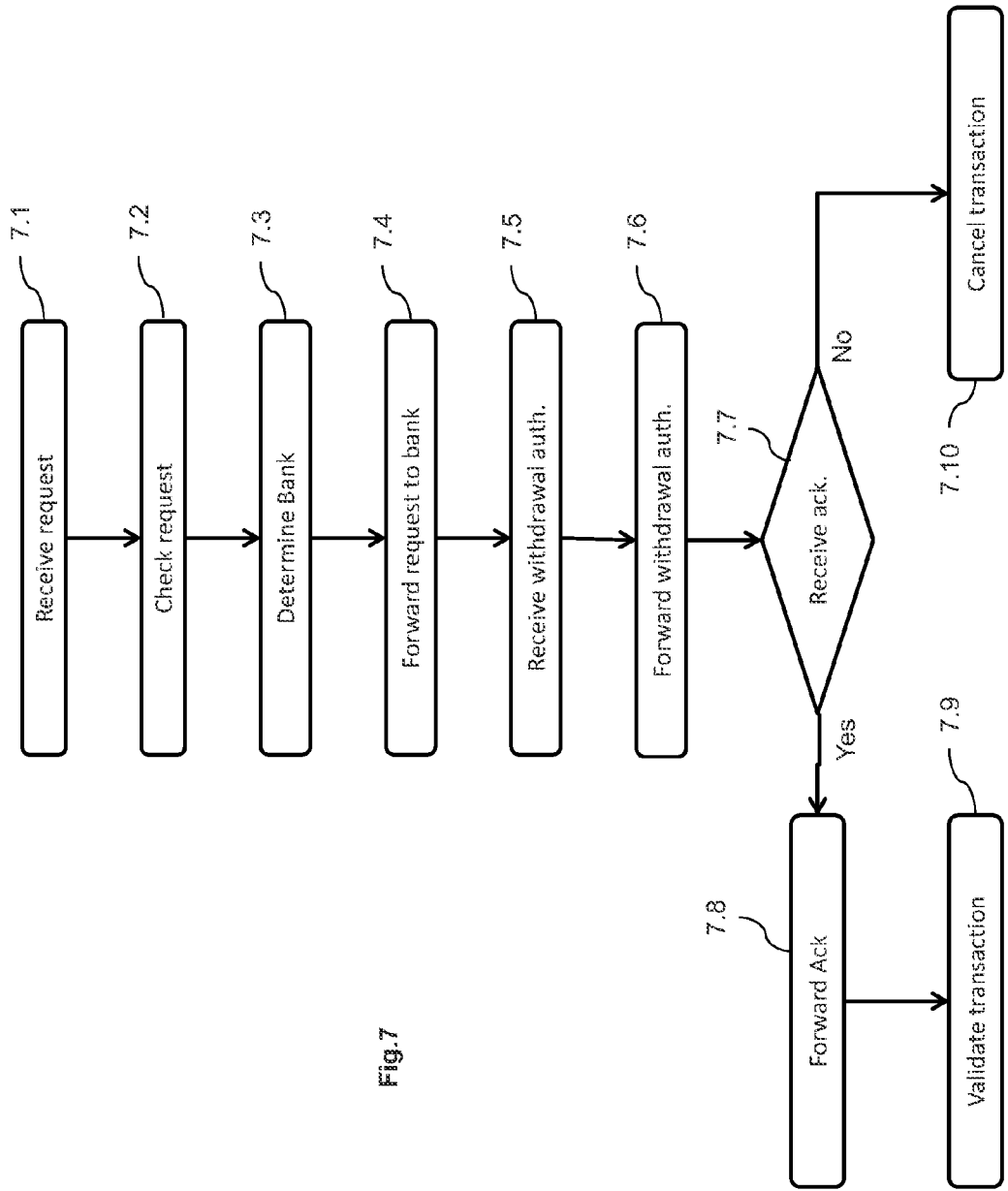
FIG. 7 illustrates the main steps of a process for exchanging electronic banknotes against real banknotes in an ATM by the GSMT server according to an embodiment of the invention.

FIG. 7 illustrates the main steps of a process for exchanging electronic banknotes against real banknotes in an ATM by the GSMT server.

In a step 7.1, the server receives the withdrawal request from the mobile device of a GSMT user. This request is the request sent at step 6.2 on FIG. 6. This request is treated mainly as an electronic money transfer request as described in relation with FIG. 5. This request includes the identifier of the ATM targeted for the withdrawal operation by the user.

In a step 7.2, the request is checked by the GSMT server. This checking is similar to the checking step done in case of an electronic money transfer as described for step 5.5 of FIG. 5.

In a step 7.3, the server has to determine the authority in charge of the targeted ATM. It may be done by interrogating a database that gives for each ATM identifier the authority or bank it is associated with. Alternatively the bank identifier may be encoded within the ATM identifier itself. In the latter case the ATM identifier includes a field representing the bank identifier, for example concatenated with the actual ATM identifier.

In a step 7.4, the server forwards the request to the determined authority for authorization of the withdrawal operation. Next, it waits for the response from the bank authorizing or not the withdrawal operation. In case it is refused a message is advantageously sent to the mobile device to cancel the operation. When an authorization is received in a step 7.5, it is forwarded to the mobile device in a step 7.6. Typically the received withdrawal authorization includes a withdrawal authorization identifier.

Next, in a step 7.7, the server waits for an acknowledgement from the bank meaning that the withdrawal operation has been successful. When this acknowledgement is received, it is forwarded to the mobile device in a step 7.8. The waiting transaction is validated at the server side in a step 7.9. If no acknowledgement or an error message is received indicating that the withdrawal operation failed at the ATM, the transaction is cancelled in a step 7.10. Advantageously, an error message is sent in this case to the mobile device.

Figure 8:
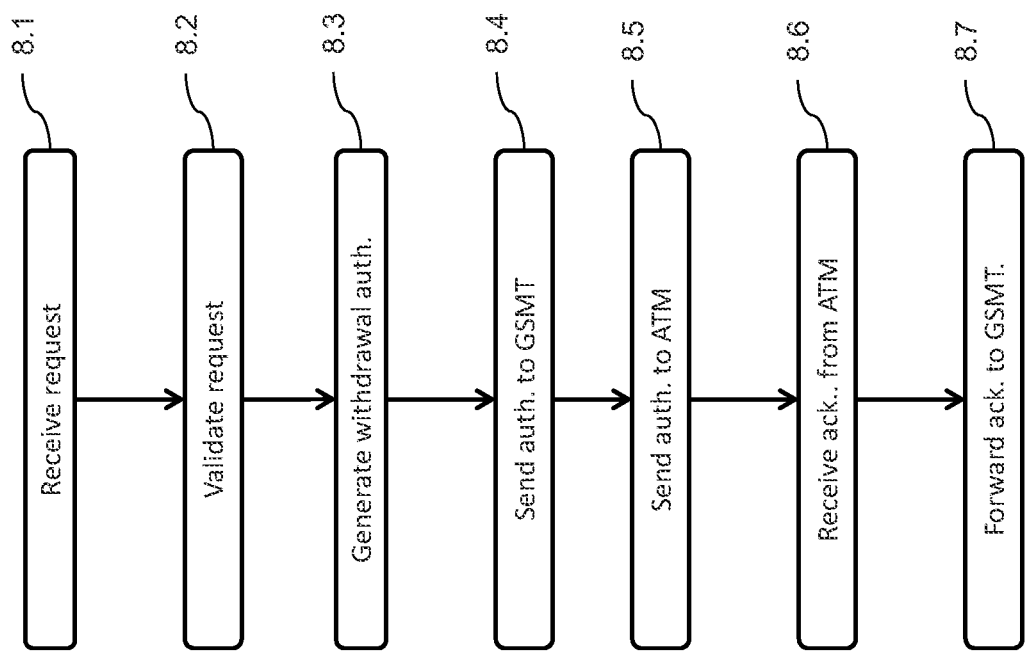
FIG. 8 illustrates the main steps of a process for exchanging electronic banknotes against real banknotes in an ATM by the bank server according to an embodiment of the invention.

FIG. 8 illustrates the main steps of a process for exchanging electronic banknotes against real banknotes in an ATM by the bank server. We remind that we use the word bank or authority to designate the authority controlling the ATM targeted for the withdrawal operation.

In a first step 8.1, the bank server receives the withdrawal request from the GSMT server. This request includes the identifier of the ATM targeted for the withdrawal operation.

It also includes the GSMT identifier of the user and the withdrawal authorization identifier.

In a step 8.2, the bank validates the request. Next, in a step 8.3 a withdrawal authorization identifier is generated. For example, it may be a six digit number generated by a simple algorithm. It may be a random number with a control to insure the uniqueness of the result for the targeted ATM.

This withdrawal authorization identifier is sent to the GSMT server in order to be communicated to the mobile device in a step 8.4. It is also include in the request that is forwarded to the targeted ATM using the ATM identifier included in the request in a step 8.5.

Next, in a step 8.6, the bank server waits for an acknowledgement from the ATM meaning that the withdrawal operation has been successful. When this acknowledgement is received, it is forwarded to the GSMT server in a step 8.7.

Figure 9:
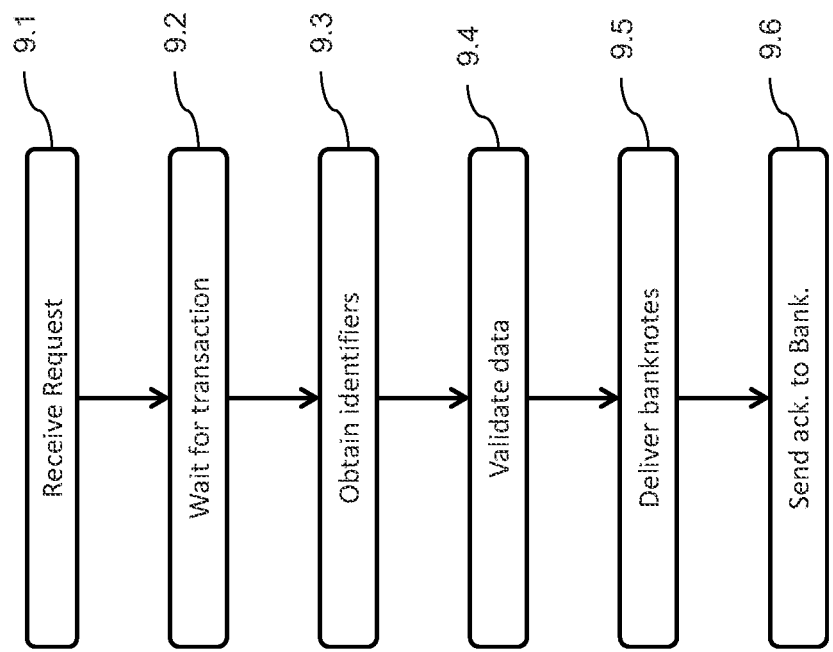
FIG. 9 illustrates the main steps of a process for exchanging electronic banknotes against real banknotes in an ATM by the ATM according to an embodiment of the invention.

FIG. 9 illustrates the main steps of a process for exchanging electronic banknotes against real banknotes in an ATM by the ATM.

In a step 9.1, the ATM receives from the bank the request for a withdrawal by a GSMT user. From this request it prepares the withdrawal. Some checks are done. For example is checked if the ATM is able to deliver the requested banknotes. If not, in some embodiment, it is checked if the ATM is able to deliver the requested amount of money with other banknotes than the ones requested. If all the conditions are successful for a withdrawal, the ATM waits for the actual withdrawal by the user in a step 9.2. The requested real banknotes are reserved while waiting.

Advantageously, a timeout is set for this waiting. If the actual withdrawal does not occur before the run out of the timeout, the withdrawal operation is cancelled. It is one benefit of the invention to allow the decoupling of the preparation of the withdrawal on the mobile device and the actual withdrawal at the ATM. This timeout may be controlled by the ATM or by the GSMT server. The entity, ATM or GSMT server, notifies the other entity when the timeout run out.

To proceed to the withdrawal, in the preferred embodiment, the user is asked to enter his GSMT identifier and the withdrawal authorization identifier that have been received by the mobile device in the ATM. It is worth noting that the mobile device itself is not requested for this operation. In alternate embodiments, the mobile device is needed and a connection is established between the mobile device and the ATM. Using this connection the mobile device may communicate the GSMT identifier and the withdrawal authorization identifier directly to the ATM. Whatever the embodiment, the ATM obtains the GSMT identifier and the withdrawal authorization identifier in a step 9.3.

Next, the ATM is checking the validity of the obtained GSMT identifier and withdrawal authorization identifier in a step 9.4. Typically it is checked if they correspond to the ones received with the request at step 9.1. If the checking is ok, the ATM delivers the requested banknotes to the user in a step 9.5. The actual delivery of the real banknote to the user is the key event that validates the electronic money transfer between the user and the bank, leading to the definitive suppression of the electronic banknotes from the electronic wallet of the user.

Next, in a step 9.6 an acknowledgment is sent back to the bank server to indicate that the actual withdrawal has succeeded. If not, an error message is typically displayed and another one is sent back to the bank server.

The described system allows a withdrawal of real banknotes from electronic ones. The operation is not linked to a user bank account as it is in a typical ATM. The electronic banknotes are transferred to an authority managing ATM according to the invention. This authority is delivering the real banknotes to the user corresponding to the transferred banknotes. It is actually for the user a mean to transform electronic banknotes into real ones. It is particularly useful when a transaction is to be made with a recipient not owning a mobile device handling a GSMT electronic wallet. It is also a key feature to establish confidence into the electronic money system for the customer. It is worth noting that electronic money is never stored in the ATM. It never transit by the ATM either. This means that the ATM may not be robbed or attacked to get electronic money.

Figure 10:
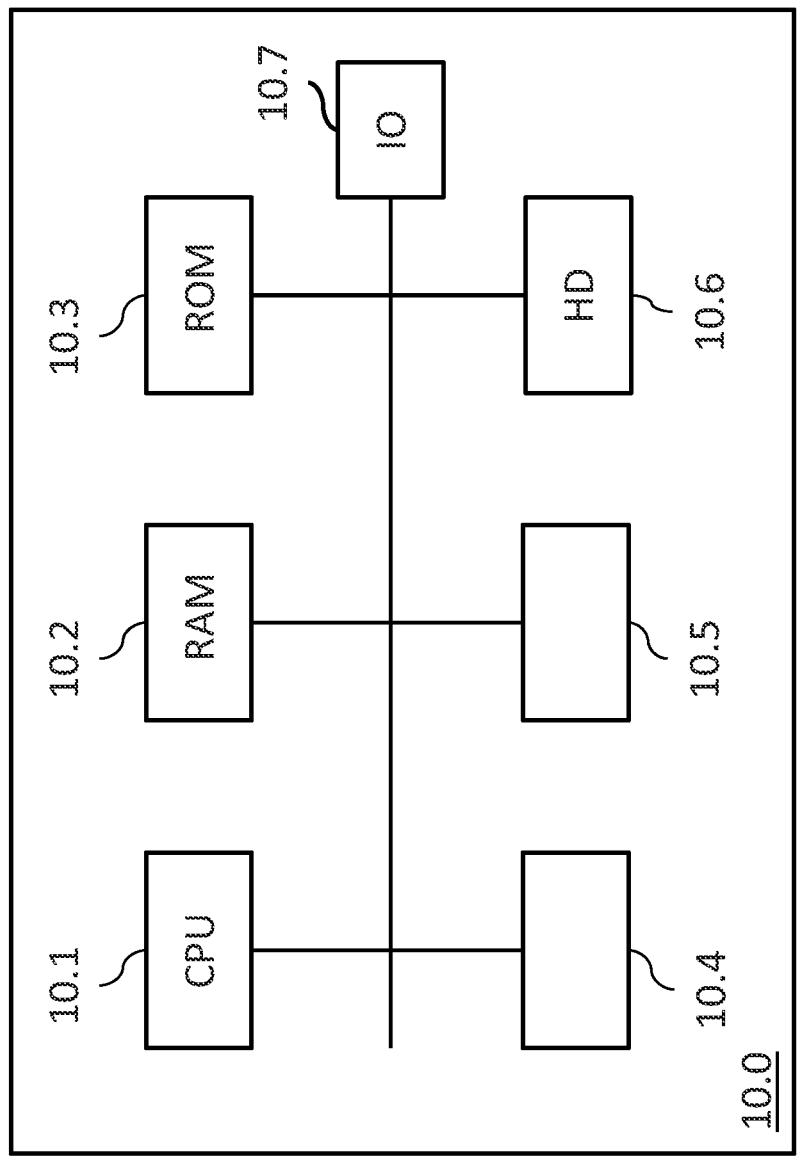
FIG. 10 illustrates the schematic block diagram of a computing device for implementation of one or more embodiments of the invention.

FIG. 10 is a schematic block diagram of a computing device 10.0 for implementation of one or more embodiments of the invention, typically the device handling the virtual wallet. The computing device 10.0 may be a device such as a micro-computer, a workstation or a light portable device. The computing device 10.0 comprises a communication bus connected to:

- a central processing unit 10.1, such as a microprocessor, denoted CPU;
- a random access memory 10.2, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 10.3, denoted ROM, for storing computer programs for implementing embodiments of the invention;
- a network interface 10.4 is typically connected to a communication network over which digital data to be processed are transmitted or received. The network interface 10.4 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 10.1;
- a user interface 10.5 may be used for receiving inputs from a user or to display information to a user;
- a hard disk 10.6 denoted HD may be provided as a mass storage device, alternatively, the mass storage may be constituted of flash memory;
- an I/O module 10.7 may be used for receiving/sending data from/to external devices such as a video source or display.

The executable code may be stored either in read only memory 10.3, on the hard disk 10.6 or on a removable digital medium such as for example a disk. According to a variant, the executable code of the programs can be received by means of a communication network, via the network interface 10.4, in order to be stored in one of the storage means of the communication device 10.0, such as the hard disk 10.6, before being executed.

The central processing unit 10.1 is adapted to control and direct the execution of the instructions or portions of software code of the program or programs according to embodiments of the invention, which instructions are stored in one of the aforementioned storage means. After powering on, the CPU 10.1 is capable of executing instructions from main RAM memory 10.2 relating to a software application after those instructions have been loaded from the program ROM 10.3 or the hard-disc (HD) 10.6 for example. Such a software application, when executed by the CPU 10.1, causes the steps of the flowcharts shown in FIGS. 4 to 9 to be performed.

Any step of the algorithm shown in FIGS. 4 to 9 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for exchanging electronic banknotes against real banknotes by a withdrawal at an ATM, the method comprising the steps of:
   receiving at the ATM, as a request for a transaction, a withdrawal authorization from an authority in charge of the ATM, including an identifier of the user and a generated withdrawal authorization identifier;
   preparing the withdrawal at the ATM by reserving real banknotes associated with the withdrawal, and then waiting for completion of an actual withdrawal by the user,
   said actual withdrawal by the user being complete upon carrying out all the steps of
      obtaining, at the ATM, an user identifier and a withdrawal authorization identifier from the user,
      checking, at the ATM, the obtained user identifier and withdrawal authorization identifier against the received identifier of the user and the generated withdrawal authorization identifier,
      determining, at the ATM, whether the obtained user identifier and withdrawal authorization identifier and the received user identifier and withdrawal authorization identifier match,
      and, on condition that said determining step determines that the obtained user identifier and withdrawal authorization identifier and the received user identifier and withdrawal authorization identifier match, the ATM delivers the reserved real banknotes and sends an acknowledgement of the completion of the actual withdrawal to an authority server in charge of the ATM.

2. The method according to claim 1, further comprising: upon receiving the withdrawal authorization at the ATM, triggering a timeout; and
   cancelling the operation at the ATM if the reserved real banknotes have not been delivered before the timeout runs out.

3. The method according to claim 1, wherein if said determining step determines that the obtained user identifier and withdrawal authorization identifier and the received user identifier and withdrawal authorization identifier match, and if real banknotes matching the electronic banknotes to exchange are not available in the ATM, delivering other real banknotes for a same amount.

4. A non-transitory computer-readable storage medium having instructions stored thereon of a computer program that, when executed on a computer, causes the computer to implement the method according to claim 1.

5. The method according to claim 1, wherein the withdrawal authorization is generated from a request identifying at least one electronic banknote to be exchanged, identifying the ATM and identifying the user.

6. The method of claim 1, wherein the authority server in charge of the ATM performs the steps of:
   receiving a request including the ATM identifier for the exchange of at least one electronic banknote and the user identifier from a central server;
   checking the request;
   generating the withdrawal authorization identifier;
   sending to the central server a second withdrawal authorization including the generated withdrawal authorization identifier;
   sending the withdrawal authorization to the ATM including the user identifier and the generated withdrawal authorization identifier;
   receiving the acknowledgement from the ATM; and
   forwarding the acknowledgement to the central server.

7. The method according to claim 6, wherein the authority server in charge of the ATM further performs the steps of:
   triggering a timeout when sending the withdrawal authorization to the ATM; and
   cancelling the operation if the acknowledgment has not been received before the timeout runs out.

8. The method according to claim 6, the central server performs the steps of:
   receiving a request including the ATM identifier for the exchange of at least one electronic banknote contained in an electronic wallet from a mobile device that handles said electronic wallet and the user identifier;
   checking the request;
   determining the authority in charge of said ATM from its identifier;
   forwarding the request to the identified authority;
   receiving from the authority the withdrawal authorization including the generated withdrawal authorization identifier;
   forwarding said withdrawal authorization to the mobile device;
   validating the transaction when the acknowledgment is received from the authority.

9. The method according to claim 8, wherein determining the authority in charge of said ATM from its identifier comprises:
   interrogating a database that gives for each ATM identifier the authority it is associated with.

10. The method according to claim 8, wherein determining the authority in charge of said ATM from its identifier comprises:
   decoding an authority identifier encoded in the ATM identifier.

11. The method according to claim 8, further comprising by the mobile device handling the electronic wallet:
obtaining the identifier of the ATM targeted for the withdrawal;
sending a request to a central server including the ATM identifier for the exchange of at least one electronic banknote contained in said electronic wallet and the user identifier;
receiving the withdrawal authorization from the central server; and
validating the withdrawal transaction upon reception of the acknowledgement of the withdrawal from the central server.

12. The method according to claim 11, wherein said ATM identifier is obtained from a user entry on the mobile device.

13. The A method according to claim 11, wherein said ATM identifier is obtained from a selection by the user among a list of proposed ATM by a geo location application.

14. The method according to claim 11, wherein said ATM identifier is obtained from the targeted ATM by a connection established between the ATM and the mobile device.

15. The method according to claim 11, further comprising:
displaying the withdrawal authorization identifier received in the withdrawal authorization.

16. The method according to claim 11, further comprising:
marking the at least one banknote to be exchanged as reserved until the validation of the withdrawal transaction.

17. The method according to claim 11, further comprising:
communicating through the central server with a user interface module on a computing device connected to the central server.

18. The method according to claim 1, wherein in the reserving of the real banknotes, marking the real banknotes such that the real banknotes are prevented from any other use until such time as the transaction is complete.

* * * * *